United States Patent Office 3,705,204
Patented Dec. 5, 1972

3,705,204
PROCESS FOR RECOVERING CONJUGATED DI-
OLEFINS SELECTIVELY FROM A $C_5$ FRACTION
Tatsuo Horie, Tokyo, and Syunichi Yamamoto and Shinji
Gotoh, Yokohama, Japan, assignors to Nippon Oil
Company, Limited, Tokyo, Japan
Continuation-in-part of application Ser. No. 729,765,
May 16, 1968. This application Aug. 7, 1970,
Ser. No. 62,153
Claims priority, application Japan, May 18, 1967,
42/31,188
Int. Cl. C07c 7/08
U.S. Cl. 260—681.5                                2 Claims

ABSTRACT OF THE DISCLOSURE

A process for recovering useful conjugated diolefins selectively and efficiently from a $C_5$ fraction obtained by cracking of hydrocarbons by a combination of steps of a heat treatment of the starting $C_5$ fraction under relatively mild conditions, division of thus heat-treated fraction into substantially three fractions in a fractionator, i.e. first, second and third fractions, and recycling of said second fraction to the starting heat treatment step.

This application is a continuation-in-part of Ser. No. 729,765, filed May 16, 1968, and now abandoned.

BACKGROUND OF THE INVENTION

(1) Field of the invention

This invention relates to a process for recovering conjugated diolefins effectively from a $C_5$ fraction obtained by cracking of hydrocarbons. More particularly, it relates to a novel process for recovering useful diolefins such as isoprene, cyclopentadiene, piperylene and the like, selectively in high efficiency and purity from a $C_5$ fraction by adopting a suitable combination of heat treatment, fractionation and extractive distillation.

(2) Description of the prior art

It is well known heretofore that the thermal or catalytic cracking of hydrocarbons produces conjugated diolefins such as isoprene, piperylene and cyclopentadiene, monoolefins such as 1-pentene, 2-pentene, isopentene and cyclopentene, paraffins such as n-pentane and isopentane and various acetylenes as $C_5$ fraction hydrocarbons, in addition to useful lower hydrocarbons such as ethylene, propylene butene and butadiene, at the same time.

However, the selective recovery of conjugated diolefins such as isoprene, piperylene and cyclopentadiene which are particularly useful among the $C_5$ fraction by way of a simple fractionation is difficult since these conjugated diolefins tend to form an azeotropic mixture due to their neighbouring boiling points. Thus, there have been made many studies with regard to the recovery of diolefins by utilizing extractive distillation and azeotropic distillation techniques.

In recovering a high-purity isoprene free from cyclopentadiene which impedes the polymerization thereof from a fraction containing a large amount of cyclopentadiene, the extractive distillation method known heretofore is encountered by many difficulties.

Therefore, it is necessary to remove cyclopentadiene as thoroughly as possible from a starting oil prior to the extractive distillation, or, alternatively, to facilitate recovery of the desired isoprene by further dimerizing and separating cyclopentadiene which remains in relatively large amount even after the extractive distillation sufficiently by heating as disclosed in Japanese Pat. No. 297,577 which corresponds to U.S. Pat. No. 2,971,036 to Esso Research and Engineering Co.

However, in the latter method mentioned above, there is a necessity for enhancing the conversion of cyclopentadiene to dimers thereof to the highest degree, in order to obtain a high-purity isoprene. For this reason, there are required rather severe reaction conditions for the dimerization reaction involving, for example, a temperature of 100° C. and a reaction time of 25 hours under an elevated pressure.

Hence, the dimerization reaction tends to induce copolymerization of cyclopentadiene with isoprene or piperylene and, as a result, a considerable loss of isoprene contained in the starting oil is almost inevitable, not to mention inconveniences in the requirement for enlarged equipment and contamination problem.

There has been proposed a process for obtaining somewhat concentrated isoprene from a $C_5$ fraction in U.S. Pat. No. 3,301,915 to International Synthetic Rubber Company, Limited.

The process essentially comprises drawing a concentrated cyclopentadiene as a side stream from the middle portion of a tower in fractionating a $C_5$ fraction, subjecting thus drawn concentrated cyclopentadiene to a thermal polymerization and feeding back thus polymerized cyclopentadiene to the originating place thereby substantially decreasing cyclopentadiene in the tower.

However, this process has a disadvantage in that when the starting $C_5$ fraction contains considerable amount of cyclopentadiene, significant amounts of isoprene and piperylene are lost due to their copolymerizations with cyclopentadiene and they may not be recovered effectively. In addition, the operation of the tower becomes difficult when the starting material contains a large amount of cyclopentadiene, thus, there is a necessity for decreasing cyclopentadiene content in the material beforehand by the thermal dimerization according to the conventional methods and the rate of recovery of isoprene is decreased.

There has been proposed an alternative process as disclosed in U.S. Pat. No. 3,230,157 to Esso Research and Engineering Co., in which the desired isoprene is recovered through a two-step extractive distillation.

The process, according to the examples, requires a large amount of extracting solvent with respect to $C_5$ fraction in the extractive distillation, e.g. in a ratio of 1:1 in the first tower and that of 1:2, which is even higher than the preceding step, in the second tower. Thus, the process has obvious drawbacks in that these distillation towers are heavily burdened on that the expenses for purifying and recovering the solvent could be quite substantial.

SUMMARY OF THE INVENTION

An object of this invention resides in the provision of a novel process for recovering useful conjugated diolefins from a $C_5$ fraction effectively in a high efficiency with minimal running cost without requiring complicated operations, free from drawbacks accompanied by the prior art processes.

Since isoprene is contained in a $C_5$ fraction only in a small amount, e.g. 10–20% and generally, 15%, the advent of a process capable of recovering the isoprene sufficiently enough which may be practiced easily and inexpensively on a commercial scale has been longed for, and this invention provides an effective process in response thereto.

The process of this invention comprises subjecting a $C_5$ fraction to a heat treatment under relatively mild conditions, dividing said fraction thus treated into three fractions in a fractionation tower, subjecting a first fraction containing mainly isoprene and substantially free from cyclopentadiene to a further extractive distillation to recover isoprene, recycling a second fraction which is a side stream rich in cyclopentadiene as a conjugated diolefin to the starting heat treatment step and separating a fraction rich in piperylene and dicyclopentadiene but containing practically no isoprene as a third fraction.

More practically, the process of this invention comprises the following steps:

1st step: Heat treatment for dimerizing at least a part of cyclopentadiene in a $C_5$ fraction.
2nd step: Fractionation for dividing the $C_5$ fraction into three fractions, viz, the first fraction which is rich in isoprene but substantially free from components having boiling points higher than that of cyclopentadiene; the second fraction containing isoprene and cyclopentadiene and components having boiling points lower than that of trans-piperylene; and the third fraction rich in piperylenes and dicyclopentadiene but substantially free from isoprene.
3rd step: Recovering of a high-purity isoprene by the extractive distillation of said first fraction.
4th step: Recycling of said second fraction to the starting heat treatment step.

The heat treatment of the 1st step mentioned above may be carried out either in a continuous system or a batch system employing any of a heating furnace, an electric furnace or a heating apparatus of heat-exchanging type.

At this point, it is desirable to remove at least a part of components having boiling points lower than that of isoprene, e.g. 2-methylbutene-1, dimethyl acetylene and isopentane, from the starting $C_5$ fraction prior to the heat treatment by way of a relatively simple fractionating procedure, since such pre-treatment is effective for enhancing efficiencies in the subsequent operations.

However, as can be understood from the following Table 1, when the conversion of cyclopentadiene to dimers thereof in the dimerization reaction is brought up sufficiently high, there is a disadvantage in that the loss of isoprene is apparently increased due to polymerization thereof, particularly codimerization with cyclopentadiene, leading to decrease in the amount of isoprene recovered.

The process of this invention has an advantage in that the conversion of a cyclopentadiene in the dimerization reaction need not necessarily be so high on account of reasons given in the explanation of the subsequent 2nd step described hereinafter, thus, the heat treatment may be conducted under relatively mild conditions, enabling to minimize the loss of isoprene as well as to reduce the capacity of equipment employed for the heat treatment.

Moreover, by carrying out the heat treatment under such mild conditions, there can be obtained a dicyclopentadiene dimer substantially free from codimers of isoprene with cyclopentadiene. In other words, there can be recovered a high-purity dicyclopentadiene capable of affording a high-purity cyclopentadiene in a high yield.

TABLE 1.—RELATIONSHIP BETWEEN HEAT TREATMENT CONDITIONS AND CONVERSIONS OF CYCLOPENTADIENE AND ISOPRENE

| Reaction conditions | | Conversions | |
|---|---|---|---|
| Temperature (° C.) | Time (hrs.) | Cyclopentadiene (percent) | Isoprene (percent) |
| 80 | 10 | 61.5 | 0 |
| 100 | 4 | 71.8 | 2.5 |
| 100 | 10 | 86 | 9-16 |
| 100 | 20 | 95 | 20 |
| 120 | 2 | 80 | 14 |
| 140 | 1 | 86.5 | 13 |

Note.—In the above experiments, the initial concentration of cyclopentadiene was 9.4% by weight, and that of isoprene was 16% by weight.

The fractionation of the 2nd step of the process of this invention is effected in a fractionator. A part of dicyclopentadiene may be removed from the starting fraction beforehand prior to the fractionation.

In the instant fractionation step, although one fractionator is preferably used, two fractionators may also be used. When using one fractionator, it is an essential requisite to draw out the second fraction which is an intermediate fraction as a side stream.

In case of using two fractionators, a top fraction of the first fractionator is taken as the first fraction and a bottom fraction may be fed to the second fractionator of which top fraction may be taken as the second fraction and the bottom fraction as the third fraction, respectively.

In the process of this invention, a mixture of the $C_5$ fraction heat-treated in the 1st step and the recycled fraction is divided into substantially three fractions, i.e. the first fraction rich in isoprene and substantially free from components having boiling points higher than that of cyclopentadiene; the second fraction containing isoprene, cyclopentadiene and components having boiling points lower than that of trans-piperylene; and the third fraction rich in piperylenes and dicyclopentadiene but substantially free from isoprene.

The operation is founded on the following reason.

In general, when attempting to separate isoprene from a $C_5$ fraction containing conjugated diolefins by the extractive distillation using a solvent such as acetone, acetonitrile or the like, the separation of isoprene from an isoprene stream containing a large amount of cyclopentadiene is almost impossible in a single extractive distillation step, due to the fact that cyclopentadiene and isoprene have closely resembling affinities with the solvent used.

It has thus been impossible to recover a high-purity isoprene free from cyclopentadiene unless following a series of procedures in which a mixture of isoprene and cyclopentadiene is mainly separated in a first step extractive distillation, then, isoprene is separated from cyclopentadiene in a second step extractive distillation as proposed in the above-mentioned U.S. Pat. No. 3,230,157 to Esso Research and Engineering Co.

In contradistinction, in the process of this invention, the separation of isoprene from cyclopentadiene is not substantially effected in the extractive distillation tower and a fraction rich in isoprene as a conjugated diolefin but substantially free from components having boiling point higher than that of cyclopentadiene, i.e. the first fraction, is obtained by way of fractionation, effectively utilizing critical differences in relative volatilities of conjugated diolefins contained in the $C_5$ fraction, and a high-purity isoprene may be obtained therefrom by the extractive distillation thereof, without requiring any strict control of the distilling conditions.

The necessity for drawing the second fraction containing isoprene, cyclopentadiene and components having boiling points lower than that of trans-piperylene as an intermediate stream is derived from the fact that, by so doing, not only the separation of the first fraction is facilitated in a high efficiency but also piperylenes and dicyclopentadiene can be separated as the third fraction at the same time.

The second fraction mentioned above contains at least a part of isoprene. However, as explained in the operation of the 4th step described hereinafter, the second fraction is recycled to the starting heat treatment step so that substantially no important decrease in the rate of recovery of isoprene is resulted therefrom. Rather, this separation of the second fraction is effective for facilitating separation of the first fraction more efficiently at relatively low reflux ratio and with less number of theoretical plate.

The third fraction obtained in the instant fractionating operation is a fraction containing mainly piperylene and dicyclopentadiene, and a high-purity dicyclopentadiene substantially free from codimers with isoprene and piperylene may be obtained by subjecting the third fraction to a conventional distillation or a steam distillation.

If required, it is possible to separate piperylene after recovering dicyclopentadiene by subjecting the resulting residue further to the extractive distillation.

In recovering isoprene by the extractive distillation of the first fraction in the 3rd step of the process of this invention, the conventional extractive distillation procedures known heretofore using acetone, acetonitrile or the like as a solvent may be conveniently followed.

In this instance, acetone or acetonitrile containing 0–25% of water may be used as a solvent and, in general, 0.3–10 mols of solvent per mol of hydrocarbon may be used.

However, since the first fraction to be extracted contains substantially no diolefins having great affinity with the solvent used other than isoprene, the extractive distillation may be carried out at relatively low ratio of solvent to hydrocarbon, e.g. 1:1, and at a low flux ratio with less number of theoretical plate.

In recycling the second fraction to the starting heat treatment step in the 4th step of the process of this invention, although the fraction may be recycled directly to the designated place, it is effective and desirable to recycle diolefin rich fraction, mainly cyclopentadiene and some isoprene, by separating the same therefrom by fractionation or a simple extractive distillation for reducing the size of circulating equipment due to reduction in the recycling amount as well as that of heat treatment equipment, and load of the fractionator.

In summary, a first feature of this invention resides in that the dimerization reaction of cyclopentadiene is effected under relatively mild condition. A second feature of this invention resides in that a $C_5$ fraction is divided into substantially three fractions in a fractionator or fractionators. A third feature of this invention resides in that the second fraction of the fractionator is recycled to the starting heat treatment step.

BRIEF DESCRIPTION OF THE DRAWINGS

Now, the process of this invention will be explained more practical by making references to the accompanying drawings in which

Referring to FIG. 1, E-1 designates a heat treatment equipment, T-1 a fractionator, T-2 an extractive distillation tower and T-3 a water washing tower, respectively.

Figure 1:
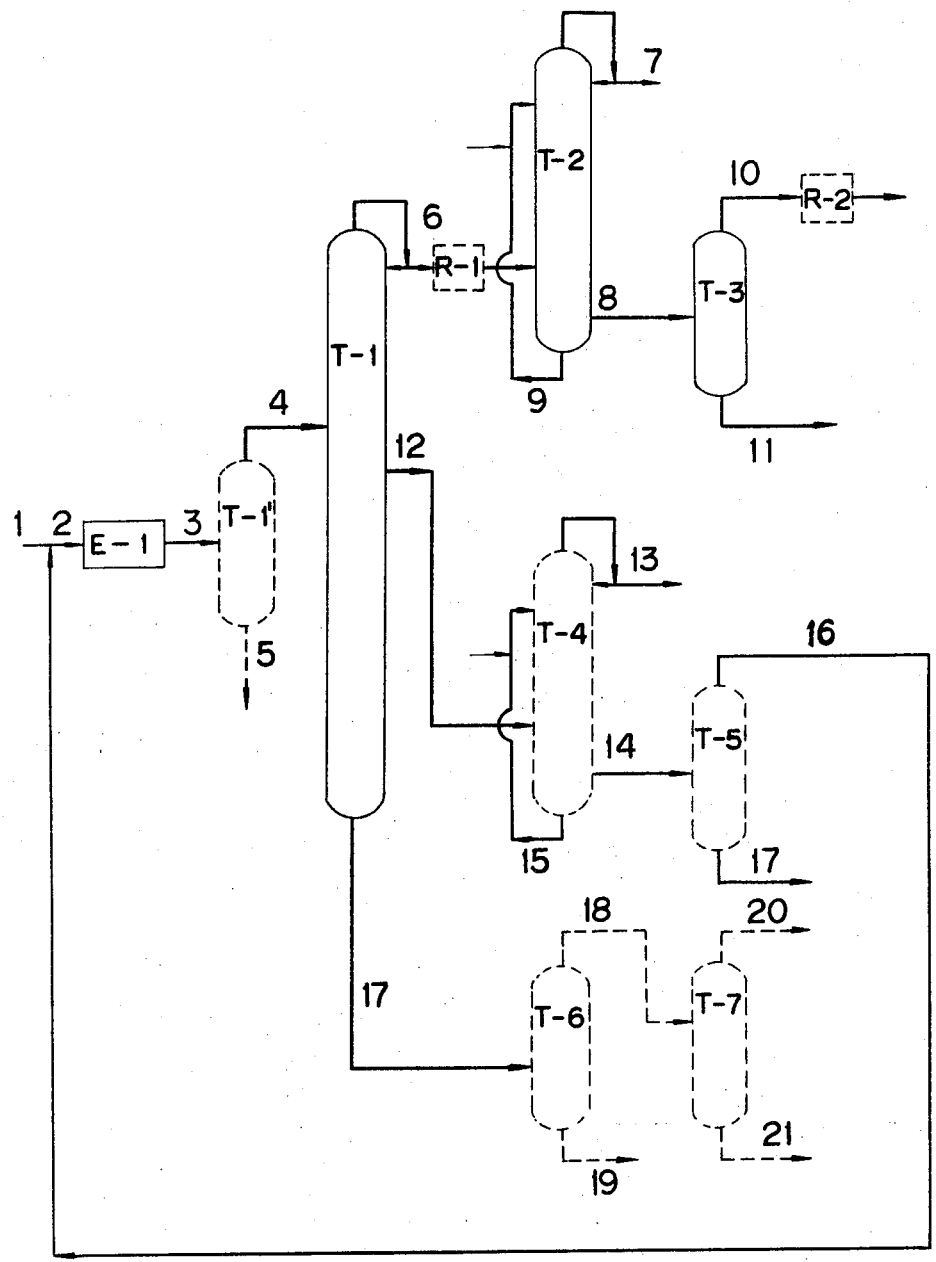
FIGS. 1 and 2 show flow sheets illustrating preferred embodiments of this invention.

The heat treatment equipment E-1 is adapted to heat-treat a starting $C_5$ fraction and a recycle stream 16 and is arranged so as to dimerize cyclopentadiene selectively.

The starting $C_5$ fraction is a hydrocarbon mixture mainly comprising $C_5$ fraction obtained by catalytic cracking or thermal cracking such as steam cracking, gaseous phase thermal cracking, sand cracking or the like of light or heavy naphtha, kerosene and gas oil fraction, heavy oil and crude oil.

The starting $C_5$ fraction is fed to a heat treatment equipment E-1 via pipes 1 and 2 and cyclopentadiene contained in the starting fraction is dimerized selectively therein. The heat treatment conditions include a temperature of from 40° to 200° C. which suffices to dimerize cyclopentadiene and a residence time of from 10 minutes to 24 hours. However, in the process of this invention, somewhat milder conditions, e.g. a temperature of 80–120° C. and a residence time of from 30 minutes to 8 hours, are preferable.

By employing such milder conditions, the loss of isoprene can be reduced to as low as 2–3%. Thus, the rate of recovery of isoprene can be enhanced effectively.

The $C_5$ fraction thus heat-treated is then fed to a fractionator T-1 via a pipe 4. At this point, a part of dicyclopentadiene may be removed therefrom beforehand in a distillation tower T-1' prior to the feeding to the fractionator T-1 by feeding the heat-treated fraction via a pipe 3 and recovering dicyclopentadiene via a pipe 5. The fractionator is a conventional distillation tower of a packed column or a multi-plate column type.

The instant embodiment illustrates the use of a single fractionator in which case the number of theoretical plates of 35–150 and a reflux ratio of 3–30 are employed. These variables may be dependent upon the composition of the $C_5$ fraction fed thereinto. However, in general, the number of theoretical plate of 50–80 and reflux ratio of 5–15 are employed for normal operation.

From the top of the fractionator T-1 is drawn a first fraction via a pipe 6 containing a large amount of isoprene but substantially no cyclopentadiene which is then fed to an extractive distillation tower T-2. The first fraction fed to the extractive distillation tower is extracted with a solvent such as acetone or acetonitrile, which is capable of extracting isoprene selectively and after mainly paraffin and monoolefins are distilled off from the top thereof via a pipe 7, the solvent extracting isoprene is fed to a washing tower T-3 and washed with water therein. Product isoprene is obtained via a pipe 10.

Figure 2:
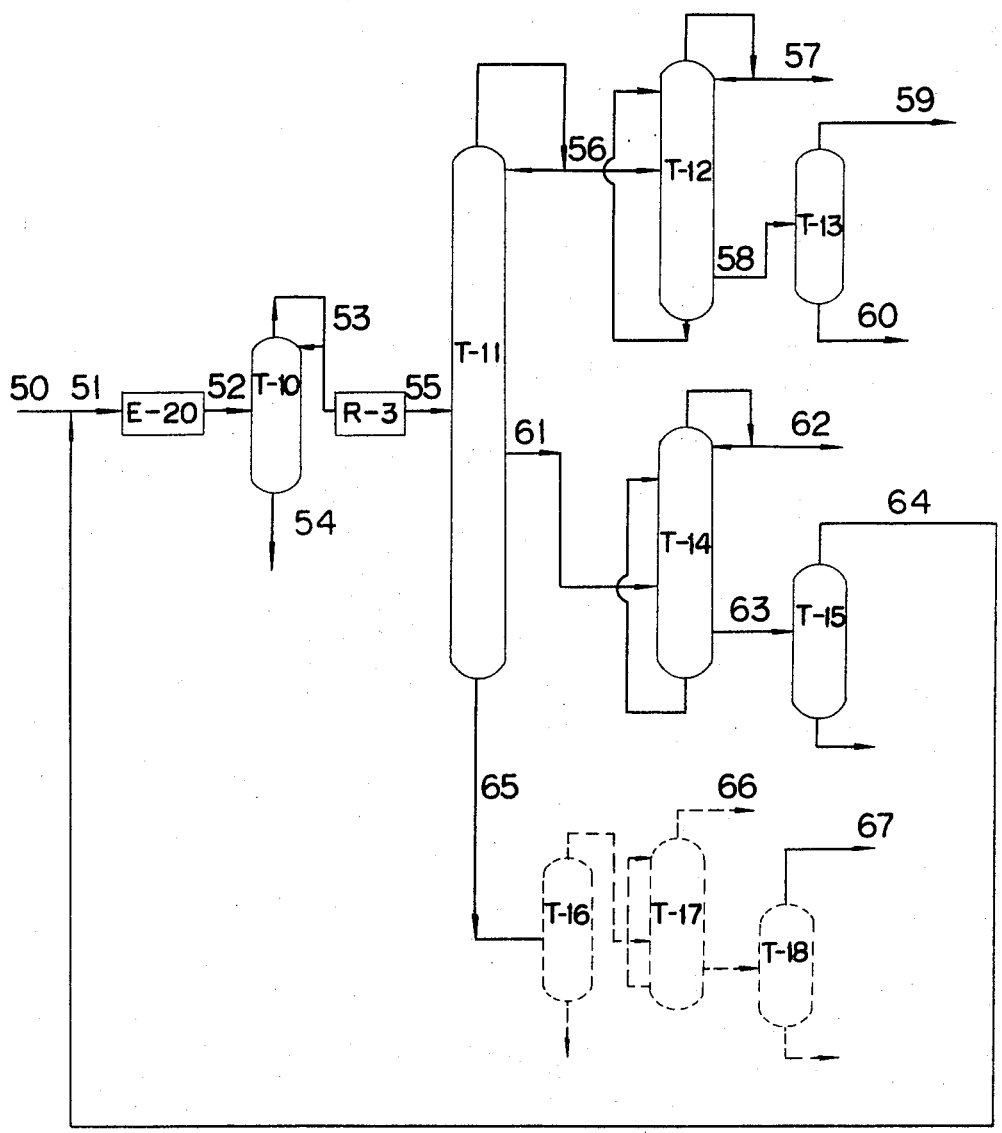

When the starting fraction contains acetylenes such as $\alpha$- or $\beta$-acetylenes, e.g. dimethylacetylene, isopropylacetylene or valylene, which are catalyst poisons in case of using isoprene as a starting material for high molecular weight polymers, these harmful acetylenes may be removed, if required, by fractionation in the final step or, alternatively, by way of selective hydrogenation thereof using a hydrogenation apparatus R-1 or R-2 provided in the path of a pipe 6 or 10 as shown in FIG. 1, or R-3 provided after the heat treatment step as shown in FIG. 2.

In the hydrogenation step mentioned above, either a gaseous phase hydrogenation method using conventional cobalt-molybdenum, copper-chromium, palladium-copper-nickel catalysts which have been known as selective hydrogenation catalysts for acetylenes, or a liquid phase hydrogenation method using platinum or palladium may be conveniently employed.

The second fraction drawn from the middle portion of the fractionator via a pipe 12 is recycled to the heat treatment equipment E-1 via a pipe 16. At this point, it is possible to separate paraffin and monoolefins from the second fraction through a pipe 13 by the extractive distillation of the same in an extractive distillation tower T-4 followed by washing in a washing tower T-5 before recycling the second fraction to the heat treatment equipment E-1.

In recovering dicyclopentadiene contained in the third fraction drawn from the fractionator T-1, the third fraction may be subjected to a distillation or a steam distillation through a pipe 17 in a distillation tower T-6 to separate dicyclopentadiene which may be drawn out from a pipe 19, and, if required, by further extractive distillation in an extractive distillation tower T-7 and washing tower T-8, piperylene may be separated and drawn out from a pipe 21.

However, when a preliminary distillation tower T-1' as shown in FIG. 1 or T-10 as shown in FIG. 2 is used, the separation of dicyclopentadiene in the distillation tower T-6, a fractionator or the extractive distillation tower T-7 may sometimes become unnecessary.

DESCRIPTION OF PREFERRED EMBODIMENTS

This invention may be explained more fully and practically in the following examples. It should not be construed, however, that these examples restrict this invention as they are given merely by way of illustration.

Example 1

In the instant example, a starting $C_5$ fraction having a composition as shown in the following Table 2 was used.

TABLE 2

Composition of starting $C_5$ fraction

| Ingredients: | Composition (percent by wt.) |
|---|---|
| Isopentane | 10.33 |
| 1-pentene | 4.2 |
| 2-methylbutene-1 | 5.53 |
| Isoprene | 15.4 |
| Trans-pentene-2 | 2.75 |
| n-Pentane | 20.56 |
| Cis-pentene-2 | 3.10 |
| 2-methylbutene-2 | 4.06 |
| Cyclopentadiene | 15.29 |
| Cis, trans-piperylenes | 7.09 |
| Cyclopentene | 3.23 |
| Cyclopentane | 3.29 |
| Dicyclopentadiene | 4.88 |
| α- and β-Acetylenes | 0.30 |
| $C_6^+$ (except dicyclopentadiene) | Trace |

To a heat treatment equipment E-1 of autoclave type were charged 50.23 g./min. of the starting fraction mentioned above and 9.39 g./min. of a recycling/stream 16 having a composition as shown in the following Table 3, and cyclopentadiene was dimerized under conditions including a heating temperature of 85° C. and a residence time of 8 hours. As a result, the cyclopentadiene content at the exit of the equipment (pipe 4) was 5.94% by weight.

TABLE 3

Composition of the recycling stream 16

| Ingredients: | Composition (percent by wt.) |
|---|---|
| 1-pentene | 0 |
| 2-methylbutene-1 | 0 |
| n-Pentane | Trace |
| Pentene-2 | 0.12 |
| 2-methylbutene-2 | 21.31 |
| Cyclopentene | Trace |
| Isoprene | 13.15 |
| Cyclopentadiene | 33.0 |
| Cis, trans-piperylenes | 31.92 |
| Acetylenes | 0.48 |

The $C_5$ fraction thus heat-treated was fed to the center portion of a fractionator T-1 having a diameter of 10 cm. and a height of 12 m. and provided with 50 steps of ripple trays.

There were distilled under a reflux ratio of 18, a first fraction from the top thereof at a rate of 33.0 g./min., a second fraction from 10 steps from the bottom thereof at a rate of 9.39 g./min. and a third fraction from the bottom thereof at a rate of 17.23 g./min. The compositions of these fractions were as shown in the following Table 4.

TABLE 4.—COMPOSITIONS OF DISTILLATES OF FRACTIONATOR

[Percent by weight]

| Ingredients | First fraction | Second fraction | Third fraction |
|---|---|---|---|
| Isopentane | 15.7 | 0 | |
| 1-pentene | 6.4 | 0 | |
| 2-methylbutene-1 | 8.43 | 0 | |
| Isoprene | 23.15 | 13.15 | 0.02 |
| Trans-pentene-2 | 4.18 | 0.11 | 0.09 |
| Cis-pentene-2 | 4.67 | 0.11 | |
| n-Pentane | 31.21 | Trace | 0.17 |
| 2-methylbutene-2 | 5.6 | 21.3 | 1.1 |
| Cyclopentadiene | 0.33 | 33.0 | 1.92 |
| Piperylenes | 0.1 | 31.95 | 20.49 |
| Cyclopentene | | | 9.4 |
| Cyclopentane | | | 9.58 |
| Dicyclopentadiene and higher hydrocarbon | | | 56.78 |
| Acetylenes | 0.21 | 0.48 | 0.46 |

The first fraction was hydrogenated in a hydrogenation reactor R-1 at 200° C. using copper-nickel catalyst for selective hydrogenation of acetylene and fed to the center portion of a packed extractive distillation tower T-2 having a diameter of 5 cm. and a height of 5 m. Aqueous acetone solution was used as a solvent at a volume ratio of 1:1 to hydrocarbons in the extractive distillation tower and the solvent was fed thereinto below 30 cm. from the top of the tower.

There were distilled under a reflux ratio of 6 a top effluent at a rate of 26.23 g./min. The bottom effluent was washed with water in a packed washing tower T-3 having a diameter of 5 cm. and a height of 3 m. where aqueous acetone solution was removed therefrom and the product isoprene was obtained at a rate of 6.76 g./min., at a rate of recovery of 86 wt. percent based on the starting material. The composition of the product isoprene as well as that of the top effluent are shown in the following Table 5.

TABLE 5

| Ingredients | Top effluent (wt. percent) | Product isoprene (wt. percent) |
|---|---|---|
| 1-pentene | 19.8 | |
| Isopentane | 8.04 | 0 |
| 2-methylbutene-1 | 10.6 | 0 |
| n-Pentane | 39.27 | Trace |
| Cis,trans-pentene-2 | 11.13 | Trace |
| 2-methylbutene-2 | 7.0 | 0.15 |
| Isoprene | 3.77 | 98.4 |
| Cyclopentadiene | 0.15 | 1.0 |
| Piperylenes | 0 | 0.44 |
| Acetylenes | 0.2 | (¹) |

¹ 300 p.p.m.

The properties of dicyclopentadiene obtained from the third fraction of the fractionator by distilling high boiling point component of a thermally polymerized oil contained therein under a reduced pressure batchwise are shown in the following Table 6.

TABLE 6

Properties of dicyclopentadiene

| | |
|---|---|
| Purity _____wt. percent__ | 93.5 |
| Rate of recovery (based on the contents cyclopentadiene and dicyclopentadiene of the starting materials) _____wt. percent__ | 90 |
| Specific gravity (20° C.) | 0.974 |
| Diene number | 0.5–0.8 |
| Peroxide number | Trace |
| Bromine number | 249 |

The fraction from which dicyclopentadiene was removed was further extractively distilled in a packed tower having a height of 7 m. using acetone as a solvent at a solvent ratio of 1:1.5 followed by washing with water to afford cis- and trans-piperylene having a purity of 97.5% at a rate of recovery of 87.4 wt. percent based on the starting material.

The above results show that the process of this invention enables recovery of high-purity conjugated diolefins selectively and efficiently from a $C_5$ fraction containing the same.

Example 2

In the instant example, the separation of diolefins was carried out using an equipment as illustrated in FIG. 2 from a starting $C_5$ fraction having a composition as shown in the following Table 7.

TABLE 7

Composition of the material $C_5$ fraction

| Ingredients: | Composition (percent by wt.) |
|---|---|
| Isopentane | 9.38 |
| 1-pentene | 3.84 |
| 2-methylbutene-1 | 3.71 |
| Isoprene | 14.16 |
| Trans-pentene-2 | 2.25 |
| Cis-pentene-2 | 2.74 |
| n-Pentane | 27.59 |
| 2-methylbutene-2 | 6.12 |
| Cyclopentadiene | 14.29 |
| Cis, trans-piperylene | 5.35 |
| Cyclopentene | 3.01 |
| Cyclopentane | 2.83 |
| Dicyclopentadiene | 4.45 |
| α- and β-Acetylenes | 0.29 |
| $C_6^+$ (except dicyclopentadiene) | Trace |

To an electric-heater E-20 were fed 43.3 g./min. of the starting fraction mentioned above through a pipe 50 and 4.0 g./min. of a recycling steam 64 having a composition as shown in the following Table 8 and the heat treatment was carried out at 90° C. for 10 hours. As a result, the cyclopentadiene content at the exit of the heater (pipe 52) was 4.24% by weight.

TABLE 8

Composition of recycling stream 64

| Ingredients: | Percent by wt. |
|---|---|
| 1-pentent | 0 |
| 2-methylbutene-1 | 0 |
| n-Pentane | Trace |
| Cis, trans-pentene-2 | 0.58 |
| 2-methylbutene-2 | 6.03 |
| Cyclopentene | 0.58 |
| Isoprene | 27.6 |
| Cyclopentadiene | 48.0 |
| Piperylene | 17.2 |
| Acetylenes | Trace |

The $C_5$ fraction thus heat-treated was fed to a tower T-10 having 10 steps of trays where higher boiling point fraction containing dicyclopentadiene is removed from the bottom thereof (pipe 54). Dicyclopentadiene was obtained by distilling high boiling point component of a thermally polymerized oil contained therein under a reduced pressure batchwise. The properties of the dicyclopentadiene thus obtained are shown in the following Table 9.

TABLE 9

Properties of dicyclopentadiene

| | |
|---|---|
| Purity _____percent__ | 94.6 |
| Rate of recovery (based on the content of cyclopentadiene and dicyclopentadiene of the starting material) _____wt. percent__ | 91.6 |
| Specific gravity (20° C.) | 0.98 |
| Diene number | 0.5-0.8 |
| Peroxide number | Trace |
| Bromine number | 251 |

Then, the main stream (pipe 53) was hydrogenated in a hydrogenation reactor R-3 at 190° C., with a space velocity of 300 l./hr. and a molar ratio of acetylene to hydrogen of 1:3, using a selective acetylene hydrogenation catalyst comprising a copper-nickel. As a result, acetylenes were reduced to 280 p.p.m.

The fraction thus hydrogenated was fed via a pipe 55 to the center portion of a fractionator T-11 having a diameter of 10 cm. and a height of 12 m. provided with 50 steps of ripple trays at a rate of 36.5 g./min.

There were distilled under a reflux ratio of 20 a first fraction from the top thereof at a rate of 15.6 g./min. via a pipe 56, a second fraction from a pipe 61 provided at 10 steps from the bottom thereof at a rate of 16.3 g./min. and a third fraction from the bottom thereof at a rate of 4.6 g./min. via a pipe 65. The composition of these fractions are shown in the following Table 10.

TABLE 10.—COMPOSITIONS OF DISTILLATES OF FRACTIONATOR

[Percent by weight]

| Ingredients | First fraction | Second fraction | Third fraction |
|---|---|---|---|
| Isopentane | 26.01 | | |
| 1-Pentene | 9.78 | 0.85 | |
| 2-Methylbutene-1 | 8.38 | 1.84 | |
| Isoprene | 37.57 | 7.5 | 0.11 |
| Trans-pentene-2 | 2.87 | 5.23 | 0.87 |
| Cis-pentene-2 | 2.87 | 4.92 | 0.87 |
| n-Pentane | 12.78 | 48.34 | 45.83 |
| 2-Methylbutene-2 | 2.56 | 15.07 | 0.87 |
| Cyclopentadiene | 0.04 | 11.88 | 1.59 |
| Piperylenes | Trace | 4.24 | 50.3 |
| Cyclopentene | | 0.12 | 0.4 |
| Cyclopentane | | | |
| Dicyclopentadiene | | | |
| Acetylenes | Trace | Trace | Trace |

The first fraction was fed to a packed extraction tower T-12. Aqueous acetonitrile solution was used as an extracting agent and the same was fed to the tower below 30 cm. from the top in a volume ratio thereof to hydrocarbons in the extractive distillation tower of 1:1.

There were distilled under a reflux ratio of 5.5 a top effluent (pipe 57) from which paraffins and olefins were separated at a rate of 10.25 g./min. and a bottom effluent (pipe 58) which was fed to a packed washing tower T-13 having a diameter of 5 cm. and a height of 3 m. where the solvent was removed therefrom and there was obtained the product isoprene (pipe 59) at a rate of 5.4 g./min. in a recovery of 88 wt. percent based on the starting material.

The following Table 11 shows the composition of the product isoprene thus obtained as well as that of the top effluent:

TABLE 11.—COMPOSITIONS

[Percent by weight]

| Ingredients | Top effluent | Product isoprene |
|---|---|---|
| 1-Pentene | 14.93 | |
| Isopentane | 39.72 | |
| 2-Methylbutene-1 | 12.8 | |
| n-Pentane | 19.52 | |
| Cis,trans-pentene-2 | 4.34 | 0.1 |
| 2-Methylbutene-2 | 3.81 | 0.18 |
| Isoprene | 4.88 | 99.6 |
| Cyclopentadiene | Trace | 0.12 |
| Piperylenes | Trace | |
| Acetylenes | Trace | Trace |

The intermediate fraction drawn from a pipe 61 of the fractionator T-11 was extractively distilled in a distillation tower T-14 where paraffins and olefins were separated and drawn out from a pipe 62 and the extract drawn from a pipe 63 was fed to a washing tower T-15 where the solvent was separated therefrom, then, the distillate drawn out from a pipe 64 was used as the recycling stream shown in the Table 8.

The third fraction drawn out from a pipe 65 of the fractionator T-11 was, after removing small amounts of polymerizates therefrom in a stripper T-16, fed to an extractive distillation tower T-17, then, to a washing tower T-18 and there was obtained cis- and trans-piperylenes having a purity of 98.3 wt. percent from a pipe 67 in a yield of 96% by weight based on the weight of the starting material.

The above results indicate that conjugated diolefins can be recovered in a high purity, selectively and efficiently, from the starting $C_5$ fraction as well as in the preceding Example 1, according to the process of this invention.

We claim:

1. A process for recovering conjugated diolefins selectively from $C_5$ fraction obtained by cracking of hydrocarbons which comprises subjecting said $C_5$ fraction to a heat treatment at 40–200° C. to dimerize at least a part of cyclopentadiene, distilling the thus-treated fraction to divide into substantially three fractions comprising a first fraction rich in isoprene and substantially free from components having boiling points higher than that of cyclopentadiene, a second fraction containing isoprene, cyclopentadiene and components having boiling points lower than that of trans-piperylene and a third fraction rich in piperylenes and dicyclopentadiene and substantially free from isoprene in a fractionator, subjecting said first fraction further to an extractive distillation in the presence of a solvent to separate a distillate fraction containing $C_5$ paraffin and mono-olefin to recover isoprene therefrom, recycling said second fraction to said heat treatment step and separating said third fraction rich in piperylene and dicyclopentadiene.

2. A process for recovering conjugated diolefins from a $C_5$ fraction obtained by cracking of hydrocarbons which comprises subjecting a mixture of said $C_5$ fraction and a recycling stream of a second fraction mentioned hereinafter to a heat treatment at 40–200° C. to dimerize at least a part of cyclopentadiene, separating dicyclopentadiene therefrom in a fractionator, hydrogenating a main stream in the presence of hydrogen to hydrogenate acetylenes contained in said main stream distilling the thus-treated fraction to divide into substantially three fractions comprising a first fraction rich in isoprene and substantially free from components having boiling points higher than that of cyclopentadiene, a second fraction containing isoprene, cyclopentadiene and components having boiling points lower than that of trans-piperylene and a third fraction rich in piperylenes and dicyclopentadiene and substantially free from isoprene by fractionation thereof, subjecting said first fraction further to an extractive distillation in the presence of a solvent to separate a distillate fraction containing $C_5$ paraffin and mono-olefin to recover isoprene therefrom, subjecting said second fraction further to separating procedures to obtain a fraction mainly containing diolefins, recycling the fraction thus obtained to said heat treatment and separating said third fraction rich in piperylene therefrom.

References Cited

UNITED STATES PATENTS

| | | | |
|---|---|---|---|
| 2,971,036 | 2/1961 | James | 260—681.5 |
| 3,301,915 | 1/1967 | King et al. | 260—681.5 R |
| 3,230,157 | 1/1966 | Hill et al. | 260—681.5 R |
| 3,436,437 | 4/1969 | Asaka et al. | 260—681.5 R |
| 3,436,438 | 4/1969 | Takao et al. | 260—681.5 R |

DELBERT E. GANTZ, Primary Examiner

V. O'KEEFE, Assistant Examiner

U.S. Cl. X.R.

203—71